United States Patent Office 2,901,287
Patented Aug. 25, 1959

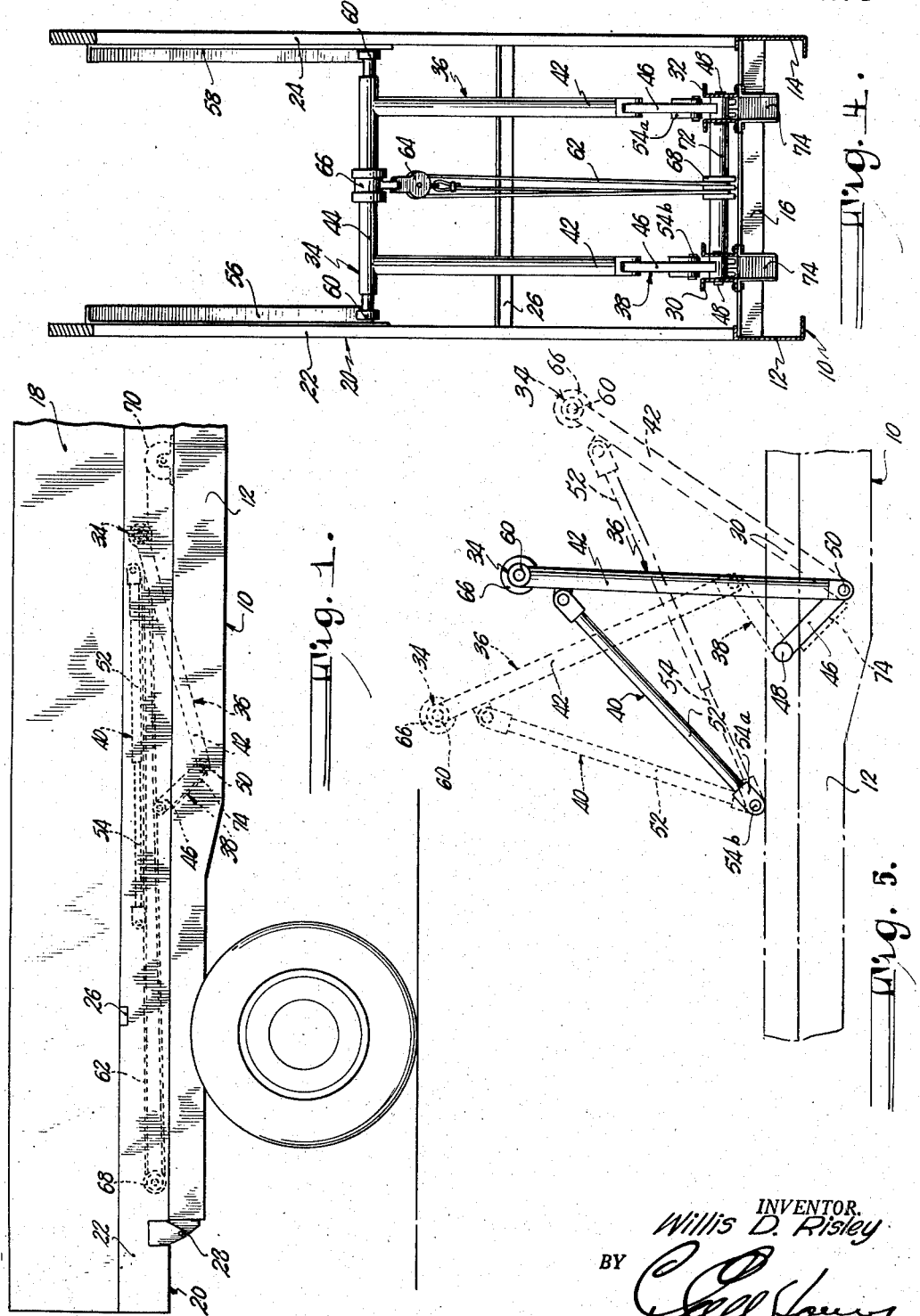

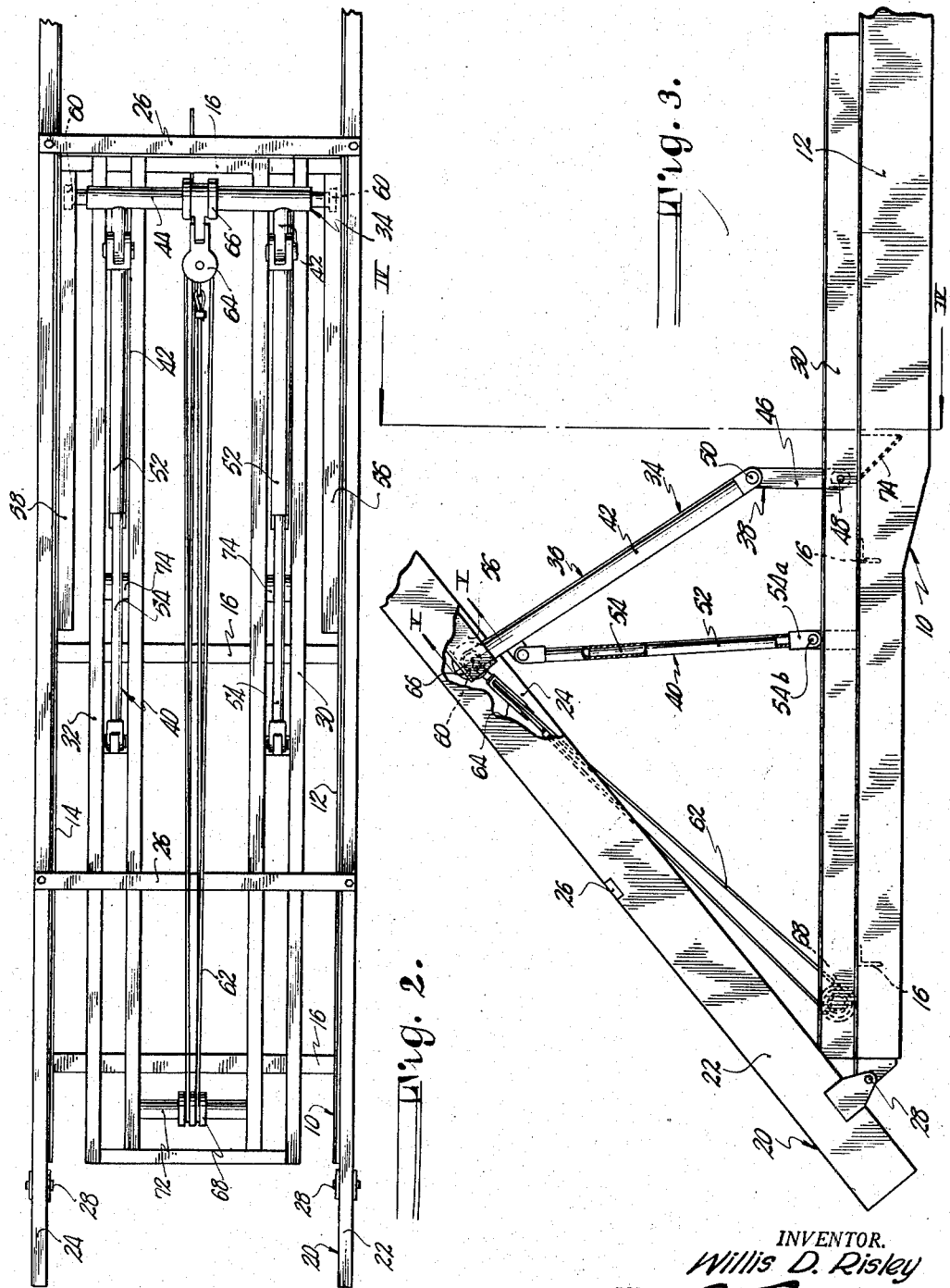

2,901,287

HOISTING MECHANISM FOR TRUCK BEDS

Willis D. Risley, Sterling, Kans.

Application July 19, 1954, Serial No. 444,186

4 Claims. (Cl. 298—19)

This invention relates to improvements in hoisting or lifting mechanisms and particularly to improvements in hoists for truck beds, the primary object being to provide a lightweight, inexpensive yet relatively powerful unit capable of imparting considerable swinging movement to the truck bed notwithstanding the simplicity and compactness of the hoisting unit itself.

It is the most important object of the instant invention to provide hoisting mechanism adapted to be interposed beween the truck bed and its chassis frame for pivotal interconnection relative thereto and including novel toggle elements together with a collapsible mechanism which during operation swings first about one fulcrum point and thereupon rocks about a second fulcrum point after the mechanism is fully collapsed.

Another important object of the present invention is to provide a hoisting mechanism which by its very construction and operation is sufficiently compact to permit disposition thereof within the confines of the chassis frame and the frame of the bed structure yet when swung to the operative position is capable of tipping the bed structure sufficiently to adequately dump its contents.

Other objects include the way in which there is included stop means for limiting the collapsibility of part of the lifting assembly so that it will work about a given axis as aforementioned; the way in which stop means is provided for one of the toggle elements so that the other toggle element will swing about a given fulcrum point during initial raising of the bed structure; the way in which the lifting assembly is disposed for reciprocation relative to the bed structure; the manner of using power means that includes a cable-pulley arrangement coupled with a winch or the like; and many important details of construction to be made clear as the following specification progresses.

In the drawings:

Fig. 1 is a fragmentary side elevational view of truck structure showing by dotted lines, the position of the hoisting mechanism of the instant invention when the bed structure is lowered;

Fig. 2 is a fragmentary plan view of the truck structure with the body entirely removed from the bed thereof;

Fig. 3 is a fragmentary side elevational view similar to Fig. 1, showing the bed structure fully elevated;

Fig. 4 is a cross sectional view taken substantially on line IV—IV of Fig. 3 looking in the direction of the arrows; and Fig. 5 is a side elevational view showing a portion of the hoisting mechanism schematically and depicting two additional positions thereof between the positions shown in Figs. 1 and 3.

The chassis frame broadly designated by the numeral 10 and forming a part of a conventional truck structure, has been chosen for illustrating the principles of the instant invention and includes, as seen best in Fig. 4 of the drawings, a pair of longitudinal beams 12 and 14 in the usual manner, beams 12 and 14 being interconnected by transverse members 16.

A truck body 18 provided with bed structure 20 is mounted on the chassis frame 10 for swinging movement from the position shown in Fig. 1 of the drawings to the position illustrated by Figs. 3 and 4. The bed structure 20 includes a pair of spaced beams 22 and 24 preferably in parallelism with the beams 12 and 14 and which may be joined by cross members 26. The beams 22 and 24 are pivotally connected with beams 12 and 14 respectively at the rearmost ends of the latter for swinging movement on aligned horizontal axes 28.

The hoisting mechanism about to be described is pivotally connected to the chassis frame 10 by virtue of the provision of a pair of longitudinal secondary beams 30 and 32 resting upon and secured to the transverse members 16. The secondary beams 30 and 32 support and pivotally mount a lifting assembly broadly designated by the numeral 34 and which includes a pair of toggle elements 36 and 38 as well as an extensible member 40. The toggle element 36 consists of a pair of elongated arms 42 interconnected at the uppermost ends thereof by a cross head 44 and the toggle element 38 consists of a link 46 for each arm 42 respectively. The lowermost ends of the links 46 are pivotally connected to the beams 30 and 32 for swinging movement on aligned, horizontal axes 48 and the links 46 are pivotally connected with the arms 42 by pins 50 parallel with the axes 48.

The member 40 is composed of an elongated, open-bottom tube 52 for each arm 42 respectively and pivotally connected thereto adjacent the cross head 44. A slide rod 54 is telescoped for free movement within each of the tubes 52, the rods 54 being pivotally connected to the secondary beams 30 and 32 rearwardly of corresponding links 46, i.e. between such links 46 and the pivotal connections 28 for the bed structure 20.

The beams 22 and 24 of the bed structure 20 are provided with elongated, longitudinally extending tracks 56 and 58 respectively and secured thereto in any suitable manner, not shown. Tracks 56 and 58 receive, and are engaged by roller means 60 at the ends of the cross head 44, as best seen in Fig. 4 of the drawings.

Any suitable apparatus may be employed for raising or actuating the assembly 34 and a preferred form of such apparatus is illustrated in the drawings. It includes a continuous cable 62 secured at one end thereof to a pulley block 64 that is in turn swingably attached to the cross head 44 by a suitable clevis or clamp means 66. From the block 64 the cable 62 extends rearwardly of the bed structure 20 around a multi-grooved pulley 68, thence forwardly of the bed structure 20, around the pulley of block 64, then rearwardly and around the pulley 68. From pulley 68 the cable 62 extends forwardly to an operable connection with a suitable winch 70 that may be operated in any suitable manner such as by a power take-off from the truck itself. Pulley 68 is carried by the beams 30 and 32 adjacent the rearmost ends thereof by means of a cross support 72 interconnecting the beams 30 and 32.

The extent of retraction of member 40 is determined by bifurcated brackets 54a serving to pivotally attach the rods 54 to the beams 30 and 32 by pivot pins 54b, and presenting stops for the proximal ends of tubes 52.

The extent of swinging movement of the links 46 is limited by downwardly and forwardly inclined stops 74 carried by the secondary beams 30 and 32 adjacent to and below the axes 48.

As is clear in Fig. 1 of the drawings, when the body 18 is in the normal, horizontal position resting at its forwardmost end upon the chassis frame 10, the assembly 34 is extended and is disposed in underlying relationship to the body 18 within the confines of the beams 12—14 and 22—24. In fact, the links 46 are substantially confined by each of the beams 30 and 32. When it is desired to elevate or swing the body 18 to the dumping position shown in Fig. 3 of the drawings, it is but necessary to operate the power means, namely winch 70, to exert a rearward pull upon the cross head 44. The stops 74 absorb the initial rearward thrust of the arms 42 and as the latter swing anti-clockwise, viewing Figs. 1, 3 and 5, the rollers 60—60 move rearwardly along the tracks 56 and 58, which they engage, and the arms 42 move to the full line position shown in Fig. 5 of the drawings. During such upward swinging movement of arms 42 and accordingly of the cross head 44, the arms 42 swing on the pins 50 which serve as fulcrums for the arms 42. Still further, as the arms 42 swing anticlockwise to the position shown by full lines in Fig. 5, the member 40 will collapse by virtue of the free sliding movement of the tubes 52 relative to the rods 54. Such collapsing or relative sliding movement continues until the tubes 52 abut against the stops or brackets 54a, as shown in Figs. 3 and 5.

As the pulling action upon the cross head 44 continues and as the rollers 60 continue to move rearwardly along the tracks 56 and 58, the links 46 will commence swinging anti-clockwise on axes 48 the moment that the tubes 52 abut against the stops 54a. When the links 46 commence such swinging movement the thrust is transferred from the pins 50 to pivot pins 54b for the brackets 54a and therefore, for the rods 54 of member 40.

The movement of the assembly 34 from the full line position shown in Fig. 5 to the dotted line position and thence to the position shown in Fig. 3, is a rocking or rolling action about the pivot pins 54b as fulcrums for the member 40, and therefore, the entire assembly 34. By virtue of the downward component of tubes 54 bearing tightly against the stops 54a the limit of rearward movement of the rollers 60 and therefore the limit of upward swinging movement of the bed structure 20, is determined and is substantially as shown in Fig. 3 of the drawings. Thus, there is no past-center action in the assembly 34 when in the position shown in Fig. 3, such as to prevent free downward gravitational movement of the bed structure 20 and the assembly 34 when the winch 70 is reversed for the purpose of returning the body 18 to the normal, horizontal position shown in Fig. 1 of the drawings.

This is a continuation in part of my co-pending application Serial No. 307,651, filed September 3, 1952, now abandoned, and entitled "Truck Bed Hoist."

Having thus described the invention, what is claimed as new and desired to be secured by Letters Patent is:

1. In a vehicle having a frame, a pivot connecting a bed frame to said vehicle frame along a horizontal axis, track means secured along said bed frame extending perpendicular to said pivot axis; and means for tilting said bed frame with respect to said vehicle frame, said means comprising a first unit having a link pivotally connected to the vehicle frame at a point spaced from said pivot and an arm pivotally connected to the link by a pin and having track-engaging means, and a second unit comprising an extensible member having one end thereof pivotally connected to said frame intermediate said pivot and said point, the other end of said extensible member being pivotally connected to the arm between the pin and the track-engaging means, stop means limiting the retraction of said extensible member, and power means for drawing the track-engaging means toward said pivot.

2. The invention of claim 1, wherein said frame has a stop thereon to limit the pivoting of said link.

3. The invention of claim 1, said extensible member comprising a rod pivotally secured to the frame, and a tube pivotally secured to the arm and telescoped over the rod, the stop means being on the rod adjacent the frame.

4. The invention of claim 1, wherein said power means includes cable and pulley means connecting the frame with the arm adjacent that end of the latter remote from the link.

References Cited in the file of this patent

UNITED STATES PATENTS

| 939,782   | Wright     | Nov. 9, 1909  |
| 1,152,510 | Hunt       | Sept. 7, 1915 |
| 1,264,432 | Palm       | Apr. 30, 1918 |
| 1,334,375 | Hugg       | Mar. 23, 1920 |
| 2,034,306 | Lowdermilk | Mar. 17, 1936 |
| 2,541,210 | Cunningham | Feb. 13, 1951 |
| 2,679,433 | Wasinger   | May 25, 1954  |

FOREIGN PATENTS

| 22,860 | Australia | June 1, 1935 |
| 61,296 | Norway    | Aug. 4, 1939 |